United States Patent
Schrichte

(10) Patent No.: US 8,533,078 B2
(45) Date of Patent: Sep. 10, 2013

(54) VIRTUAL REDACTION SERVICE

(75) Inventor: Christopher K. Schrichte, Missoula, MT (US)

(73) Assignee: Celcorp, Inc., Washington, DC (US)

( * ) Notice: Subject to any disclaimer, the term of this patent is extended or adjusted under 35 U.S.C. 154(b) by 573 days.

(21) Appl. No.: 12/317,371

(22) Filed: Dec. 22, 2008

(65) Prior Publication Data

US 2010/0070396 A1 Mar. 18, 2010

Related U.S. Application Data

(60) Provisional application No. 61/008,746, filed on Dec. 21, 2007.

(51) Int. Cl.
 *G06Q 99/00* (2006.01)
(52) U.S. Cl.
 USPC .............................. 705/34; 705/344; 715/255
(58) Field of Classification Search
 USPC ................ 705/34, 344, 75; 380/25; 715/255
 See application file for complete search history.

(56) References Cited

U.S. PATENT DOCUMENTS

| | | | | |
|---|---|---|---|---|
| 6,889,205 | B1 | 5/2005 | Lamm | 705/40 |
| 7,216,125 | B2 | 5/2007 | Goodwin | 1/1 |
| 7,292,723 | B2 * | 11/2007 | Tedesco et al. | 382/159 |
| 7,428,701 | B1 | 9/2008 | Gavin et al. | 715/243 |
| 7,590,693 | B1 * | 9/2009 | Chan et al. | 709/206 |
| 7,653,876 | B2 * | 1/2010 | Ethier et al. | 715/249 |
| 2001/0018739 | A1 * | 8/2001 | Anderson et al. | 713/176 |
| 2002/0062342 | A1 * | 5/2002 | Sidles | 709/203 |
| 2002/0083079 | A1 | 6/2002 | Meier et al. | 707/104.1 |
| 2002/0158864 | A1 | 10/2002 | Matichuk | 345/418 |
| 2003/0014394 | A1 | 1/2003 | Fujiwara et al. | 707/3 |
| 2003/0051054 | A1 | 3/2003 | Redlich et al. | 709/246 |
| 2003/0115481 | A1 | 6/2003 | Baird et al. | 713/201 |
| 2003/0145017 | A1 | 7/2003 | Patton et al. | 707/104.1 |
| 2004/0075692 | A1 | 4/2004 | Matichuk | 715/806 |
| 2004/0088313 | A1 | 5/2004 | Torres | 707/101 |
| 2004/0139043 | A1 | 7/2004 | Lei et al. | 707/1 |
| 2004/0236651 | A1 * | 11/2004 | Emde et al. | 705/34 |
| 2005/0027495 | A1 | 2/2005 | Matichuk | 703/2 |
| 2005/0108351 | A1 | 5/2005 | Naick et al. | 709/207 |
| 2005/0246338 | A1 | 11/2005 | Bird | 707/9 |
| 2005/0289447 | A1 * | 12/2005 | Hadley et al. | 715/501.1 |
| 2006/0064633 | A1 * | 3/2006 | Adams | 715/505 |
| 2006/0075228 | A1 | 4/2006 | Black et al. | 713/167 |
| 2006/0143459 | A1 | 6/2006 | Villaron et al. | 713/176 |
| 2006/0155863 | A1 | 7/2006 | Schmidt | 709/229 |
| 2006/0218149 | A1 | 9/2006 | Patrick | 707/9 |
| 2006/0242558 | A1 | 10/2006 | Racovolis et al. | 715/511 |
| 2006/0288285 | A1 * | 12/2006 | Lai et al. | 715/708 |
| 2007/0030528 | A1 | 2/2007 | Quaeler et al. | 358/453 |
| 2007/0094594 | A1 | 4/2007 | Matichuk et al. | 715/205 |
| 2007/0174766 | A1 * | 7/2007 | Rubin et al. | 715/530 |
| 2008/0028300 | A1 * | 1/2008 | Krieger et al. | 715/255 |
| 2008/0204788 | A1 | 8/2008 | Kelly et al. | 358/1.15 |

\* cited by examiner

*Primary Examiner* — Vanel Frenel
(74) *Attorney, Agent, or Firm* — Harrington & Smith

(57) ABSTRACT

A redaction system including a system for receiving an electronic version of a first document; a system for generating an electronic version of a second document which is a redacted version of the first document, wherein the system for generating includes a computer having a redaction engine coupled to a source of redaction rules; and a system for transmitting the second document from the redaction system.

23 Claims, 18 Drawing Sheets

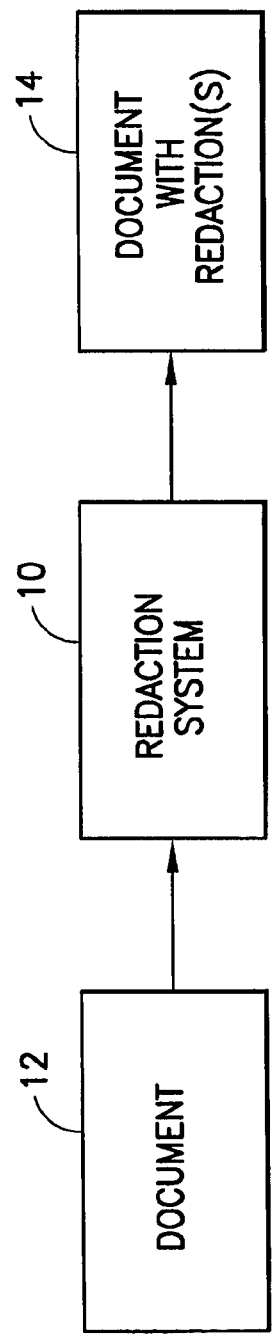
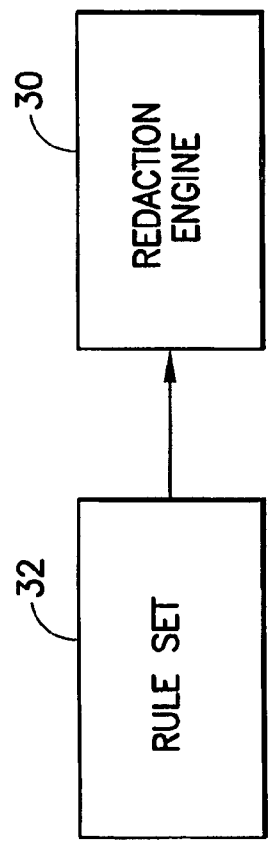

| ARREST REPORT | | |
|---|---|---|
| NAME OF SUSPECT | ADDRESS | OCCUPATION |
| JOHN DOE | 1278 ELM STREET SPRINGFIELD, VA | COURIER |
| AGE OF SUSPECT | MONITORING | |
| 32 | | |
| NAME OF OFFICER | BADGE | HOME OFFICE OF ARRESTING OFFICER |
| HENRY THOMPSON | 1234 | SPRINGFIELD, VA |
| TYPE OF ARREST | FELONY (X) MISDEMEANOR ( ) | CONTRABAND SUBSTANCES |
| DRUG TRAFFICKING | | COCAINE |
| NARRATIVE OF ARREST | | |

FIG.2

| ARREST REPORT | | | |
|---|---|---|---|
| NAME OF SUSPECT | ADDRESS | | OCCUPATION |
| JOHN DOE | 1278 ELM STREET SPRINGFIELD, VA  19 | (SECTION REDACTED) | COURIER |
| AGE OF SUSPECT | | | |
| 32 | | (SECTION REDACTED) 24 | (SECTION REDACTED) |
| (SECTION REDACTED) | TYPE OF ARREST | FELONY (X) MISDEMEANOR ( ) 27 | CONTRABAND SUBSTANCES |
| | DRUG TRAFFICKING | | COCAINE |
| NARRATIVE OF ARREST | | | |

NARRATIVE OF ARREST:

ON JUNE 20, 2005 JOHN DOE WAS OBSERVED BY SA HENRY THOMPSON AND SA GARY WILLIAMS PURCHASING A TICKET AT THE DELTA AIRLINES TICKET COUNTER. JOHN DOE PROCEEDED TO THE AMERICAN CAFE AT 123 ELM STREET TO MEET WITH FPD INFORMANT "BERT". A WHITE LETTER SIZED ENVELOPE WAS GIVEN TO JOHN DOE BY "BERT". JOHN DOE THEN GAVE "BERT" A SMALL PACKAGE WRAPPED IN BROWN PAPER. SA THOMPSON AND SA WILLIAMS FOLLOWED JOHN DOE FOR APPROXIMATELY ONE BLOCK BEFORE APPREHENDING HIM. JOHN DOE WAS PLACED UNDER ARREST AND THE SMALL PACKAGE EXAMINED AND FOUND TO BE COCAINE

FIG. 9

NARRATIVE OF ARREST:

ON JUNE 20, 2005 JOHN DOE WAS OBSERVED BY SA (REDACTED) AND SA (REDACTED) PURCHASING A TICKET AT THE (REDACTED) AIRLINES TICKET COUNTER, JOHN DOE PROCEEDED TO THE AMERICAN CAFE AT 123 ELM STREET TO MEET WITH FPD INFORMANT (REDACTED) A WHITE LETTER SIZED ENVELOPE WAS GIVEN TO JOHN DOE BY (REDACTED). JOHN DOE THEN GAVE (REDACTED) A SMALL PACKAGE WRAPPED IN BROWN PAPER. SA (REDACTED) AND SA (REDACTED) FOLLOWED JOE DOE APPROXIMATELY ONE BLOCK BEFORE APPREHENDING HIM. JOHN DOE WAS PLACED UNDER ARREST AND THE SMALL PACKAGE EXAMINED AND FOUND TO BE COCAINE

VIRTUAL REDACTION SERVICE

CROSS REFERENCE TO RELATED APPLICATION

This application claims priority under 35 U.S.C. 119(e) on U.S. provisional patent application No. 61/008,746 filed Dec. 21, 2007, and is related to commonly owned U.S. patent application Ser. No. 11/544,685 filed Oct. 6, 2006, which claims priority under 35 U.S.C. §119(e) from U.S. Provisional Patent Application No. 60/724,986 filed on Oct. 6, 2005, which are hereby incorporated by reference in their entireties.

BACKGROUND OF THE INVENTION

1. Field of the Invention

One embodiment of the invention relates to a system, method and computer program product for creating redacted documents and, more particularly, to an automated redaction system, method and computer program product.

2. Brief Description of Prior Developments

U.S. Pat. No. 6,889,205, which is hereby incorporated by reference in its entirety, discloses a system and method for preparing a redacted statement, message or file from an electronic statement, message or file and sending it to a party. U.S. Patent Publication Nos. 2002/0158864, 2004/0075692, and 2005/0027495, which are hereby incorporated by reference in their entireties, describe automatic creation of graphical representations, and intelligent agents for integrating information access over extended networks.

Businesses as well as Federal, State and Local government agencies must share information. Examples include case files, arrest reports, subpoenaed documents (e.g., Freedom of Information Act—FOIA, Law Enforcement Information Sharing Program—LEISP, etc.) Redacting classified, confidential or secret information from documents can be labor intensive. No effective means of automating the process of removing sensitive information from documents exists. There is a need for a system and method for automatically removing sensitive information from documents; especially a system which can work with different document types.

SUMMARY

The following summary is merely intended to be exemplary. The summary is not intended to limit the scope of the claimed invention.

In accordance with one aspect of the invention, a redaction system is provided comprising a system for receiving an electronic version of a first document; a system for generating an electronic version of a second document which is a redacted version of the first document, wherein the system for generating comprises a computer having a redaction engine coupled to a source of redaction rules; and a system for transmitting the second document from the redaction system.

In accordance with another aspect of the invention, a computer program product is provided comprising a computer readable storage medium storing a computer program configured to perform redaction operations when executed, the operations comprising receiving an electronic version of a first document; generating an electronic version of a second document which is a redacted version of the first document, wherein the system for generating comprises a computer having a redaction engine coupled to a source of redaction rules; and transmitting the second document from the redaction system.

In accordance with another aspect of the invention, a method is provided comprising receiving an electronic version of a first document; generating an electronic version of a second document which is a redacted version of the first document, wherein the system for generating comprises a computer having a redaction engine coupled to a source of redaction rules; and transmitting the second document to another party.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 is a block diagram depicting a redaction system configured to operate in accordance with one embodiment of the invention;

FIG. 2 depicts a document to be redacted by a system operating in accordance with one embodiment of the invention;

FIG. 3 depicts the document of FIG. 2 in a redacted form generated by a system operating in accordance with one embodiment of the invention;

FIG. 4 is a block diagram depicting components of the redaction system comprising an embodiment of one embodiment of the invention depicted in FIG. 1;

FIG. 8 depicts a field in the document shown in FIG. 1 that is to be redacted by a system operating in accordance with one embodiment of the invention;

FIG. 9 depicts the document field of FIG. 8 in a redacted form generated by a system operating in accordance with one embodiment of the invention;

DETAILED DESCRIPTION OF THE PREFERRED EMBODIMENTS

Figure 5:
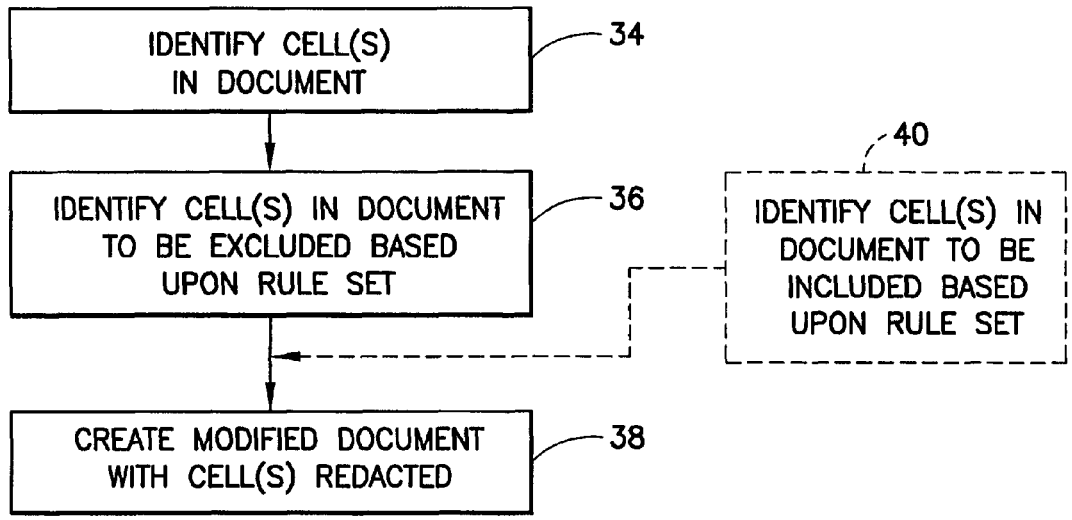
FIG. 5 is a flowchart depicting a method in accordance with one embodiment of the invention.

Referring to FIG. 1, there is shown a block diagram of a redaction system 10 incorporating features of one embodiment of the invention. Although the invention will be described with reference to the exemplary embodiments shown in the drawings, it should be understood that the invention can be embodied in many alternate embodiments.

The redaction system 10 is adapted to process a document 12 or electronic version of the document or information in the document to create a modified document or electronic version of the modified document with one or more redactions. An example is shown with reference to FIGS. 2 and 3. FIG. 2 shows a portion of an arrest report 16. The arrest report 16 comprises cells 18-29. The cells of a document could be pre-established with borders such as is shown in FIG. 2, or could be established with the software of one embodiment of the invention. As seen with reference to FIG. 3, one or more of the cells or information in the cells can be redacted in a computer generated modified document 14 of the arrest report 16.

Referring also to FIG. 4, the redaction system 10 generally comprises a redaction engine 30 and a rule set 32. The redaction engine 30 generally comprises a computer system. A computer system operating in accordance with one embodiment of the invention can take many forms such as a desktop computer; a notebook computer; or a computing system distributed across a network. In each instance, the computing system comprises a source of documents to be redacted; a memory for storing a program configured to perform operations in accordance with the methods of the invention when executed; and digital processing apparatus coupled to the source of electronic documents to be redacted and the memory. The redaction engine 30 is adapted to take an electronic version of the document 12, and remove or redact information in the document using rules accessed from the rule set 32 to produce the modified document 14. The rule set 32 comprises a set of rules and/or process models to be applied by the redaction engine 30.

Referring also to FIG. 5, the redaction engine comprises software which is adapted to identify cell(s) in a document as indicated by block 34. The redaction engine 30 is then able to identify cell(s) in the document to be excluded based upon the rule set 32 as indicated by block 36. As indicated by block 38, the redaction engine can create a modified document with one or more cells redacted. For the example shown in FIGS. 2 and 3, the redaction engine can identify the cells 18-29 in the original document 12, identify the cells 22, 23, 24 and 25 to be excluded based upon the rule set 32, and create the modified document 14 with the information in the cells 22-25 redacted. In this embodiment the redacted information is replaced by the phrase "SECTION REDACTED". However, any suitable type of redaction indicia, such as marking could be provided. In other embodiments, no redaction indicia are provided in the redacted versions of the documents. This masks from users what categories of information have been redacted.

In addition to identifying cell(s) to be excluded, or as an alternative to identifying cell(s) to be excluded when all are to be excluded unless indicated to be included, as indicated by block 40 the redaction engine 30 could be adapted to identify cell(s) in the document to be included based upon the rule set 32. If both 36 and 40 are performed and there is a conflict, preferably block 36 will prevail. However, any suitable conflict resolution configuration or solution could be provided.

Figure 6:
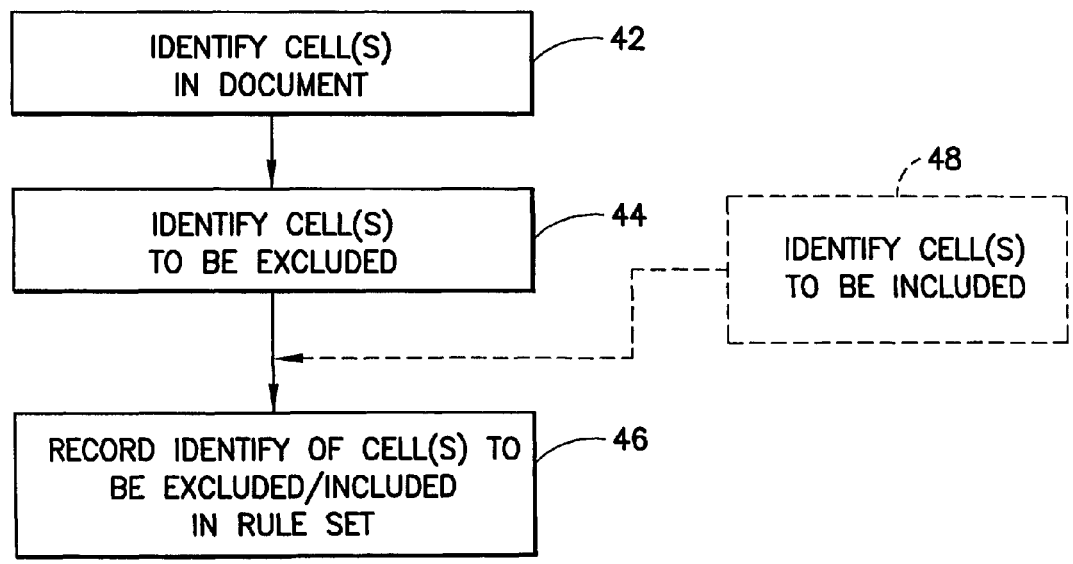
FIG. 6 is a flowchart depicting a method in accordance with one embodiment of the invention.

The rule set 32 is setup or established before the redaction engine 30 can run automatically. Referring also to FIG. 6, establishment of the rule set 32, or at least a portion of the rule set, can comprise identifying cell(s) to be excluded as indicated by block 44, such as the monitoring cell 22, the Name of Officer cell 23, the Badge number cell 24 and the Home Office of Arresting Officer cell 25 shown in FIGS. 2 and 3. The cell(s) in a sample document could be used to identifying cell(s) as indicated by block 42, such as the cells 18-29 shown in FIGS. 2 and 3. For example, use of software such as described in U.S. Patent Publication Nos. 2002/0158864, 2004/0075692, and 2005/0027495 could be used. The identity of the cell(s) to be excluded/included in the rule set is then recorded for that type of document as indicated by block 46 for use in the future on similar types of documents (e.g., other arrest reports). As indicated by block 48, cell(s) could also be identified to be included for use with block 40 shown in FIG. 5.

Figure 7:
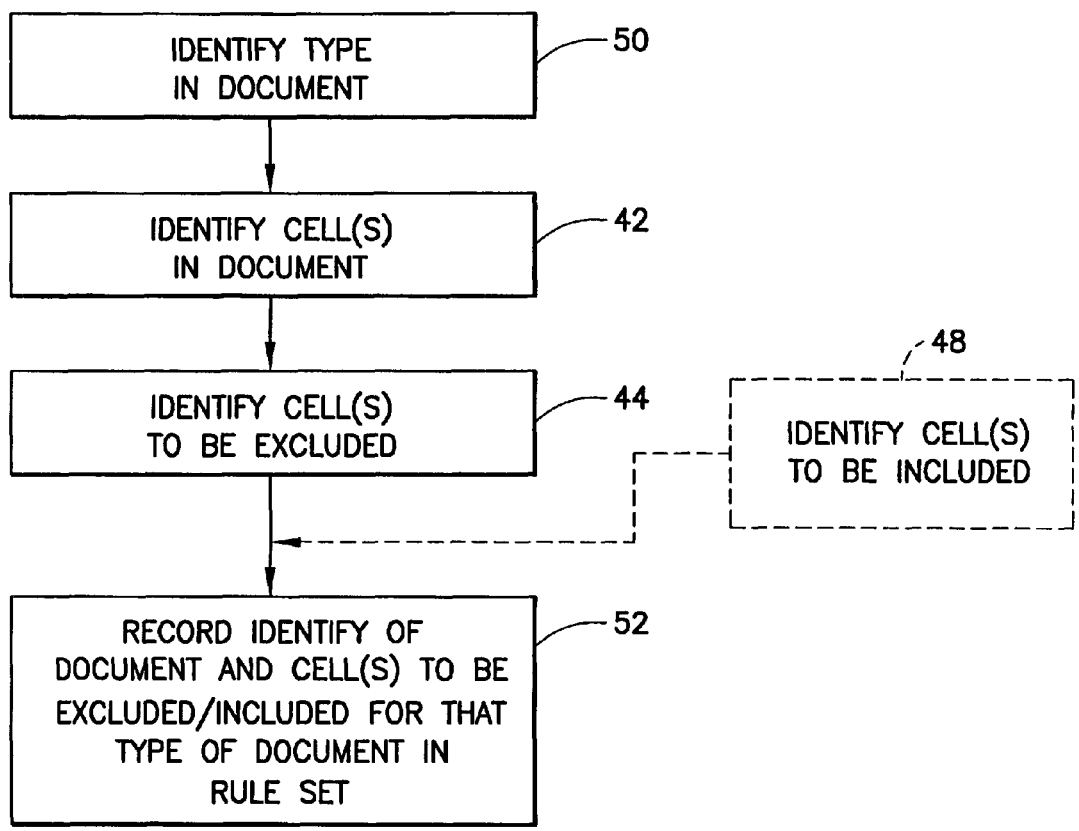
FIG. 7 is a flowchart depicting a method in accordance with one embodiment of the invention.

Referring also to FIG. 7, one embodiment of the invention can be used with different types of documents. For example, a police drug seizure report could be different than an arrest report. When the invention is used with different type documents, the redaction system is adapted to identify a type of document as indicated by block 50. This could be a manual indication of the type of document by a person inputting the document into a database, a code on the document, or automatic recognition of the document type by the redaction system for example.

After the type of document is identified, or perhaps during identification, the rule set set-up process can comprise identifying cell(s) to be excluded as indicated by block 44. The identity of the cell(s) to be excluded/included in the rule set is then recorded for that type of document as indicated by block 52 for use in the future on similar types of documents (e.g., other arrest reports). Cell(s) could also be identified to be included for use with block 40 shown in FIG. 5.

Referring also to FIG. 8, another portion of the arrest report document 12 is shown, specifically the Narrative of Arrest cell 29. Referring also to FIG. 9, which shows the cell 29 after automatic redaction by the redaction system 10, one embodiment of the invention can be used to redact sub-cells or text in a cell. The text could comprise words, phrases or characters or specific combinations for example. In the example shown, the names of the special agents, witness location, and name of confidential informant are automatically redacted. Other forms of information could also be redacted, such as, for example, graphical information (organization logos), visual information, photographic images, etc. These are merely examples.

Figure 10:
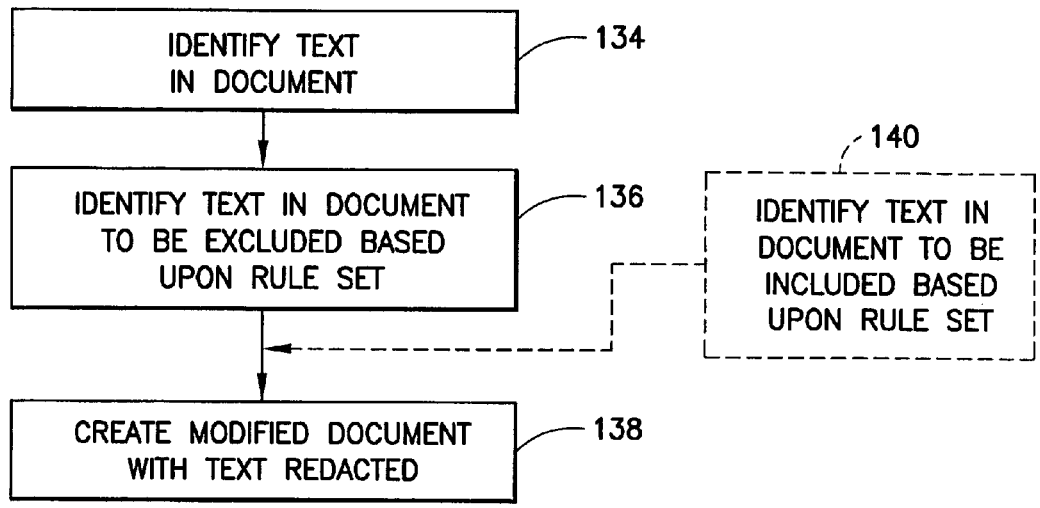
FIG. 10 is a flowchart depicting a method in accordance with one embodiment of the invention.

Referring also to FIG. 10, the redaction engine 30 comprises software which is adapted to identify text or words or phrases or characters in a document as indicated by block 134. The redaction engine 30 is then able to identify text or words or phrases or characters or areas in the document to be excluded based upon the rule set 32 as indicated by block 136. As indicated by block 138, the redaction engine can create a modified document with one or more of the identified areas redacted. For the example shown in FIGS. 8 and 9, the redaction engine can identify the names of the special agents, witness location, and name of confidential informant in cell 29 of the original document 12, identify the names Henry Thompson, Gary Williams, Delta Airlines, and informant Bert to be excluded based upon the rule set 32, and create the modified document 14 with the information in the automatically identified text redacted. In this embodiment the redacted information is replaced by the phrase "REDACTED". However, any suitable type of redaction marking or deletion could be provided. In addition to identifying cell(s) to be excluded, or as an alternative to identifying cell(s) to be excluded when all are to be excluded unless indicated to be included, as indicated by block 140 the redaction engine 30 could be adapted to identify cell(s) in the document to be included based upon the rule set 32. If both 136 and 140 are performed and there is a conflict, preferably block 136 will prevail. However, any suitable conflict resolution configuration or solution could be provided. In this example, the text to be redacted in cell 29 could be imported into the rule set from a database(s) containing names of police officers, confidential informants and witnesses for example.

Figure 11:
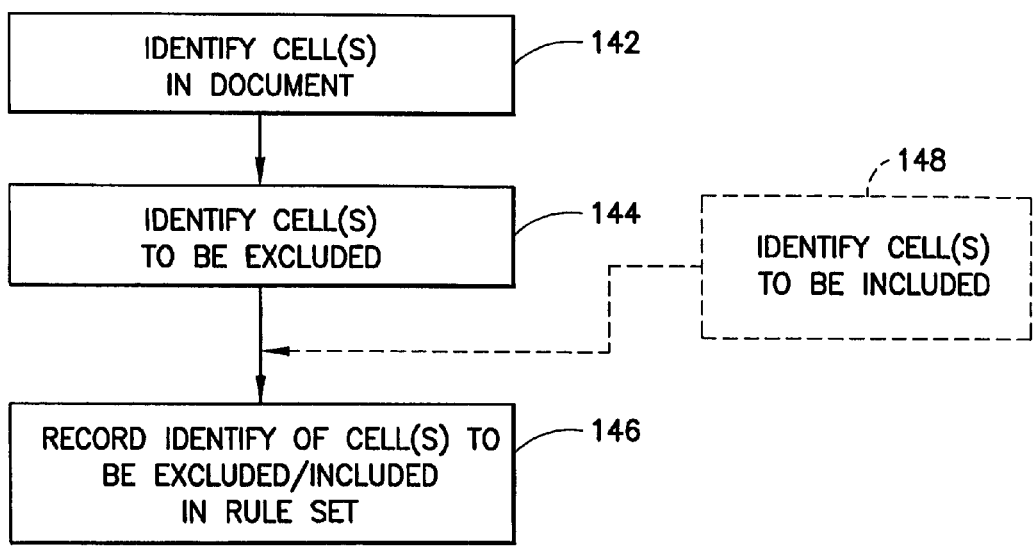
FIG. 11 is a flowchart depicting a method in accordance with one embodiment of the invention.

Referring also to FIG. 11, establishment of the rule set 32, or at least a portion of the rule set, can comprise identifying text to be excluded as indicated by block 144, such as the names of officers as shown in FIGS. 8 and 9. Text recognition software or an optical recognition software could be used. The text in previous redacted documents could be used to identify text to be excluded. For example, use of software such as described in U.S. Patent Publication Nos. 2002/0158864, 2004/0075692, and 2005/0027495 could be used. The identity of the cell(s) to be excluded/included in the rule set is then recorded for that type of document as indicated by block 146 for use in the future on similar types of documents (e.g., other arrest reports). As indicated by block 148, cell(s) could also be identified to be included for use with block 140 shown in FIG. 10.

Figure 12:
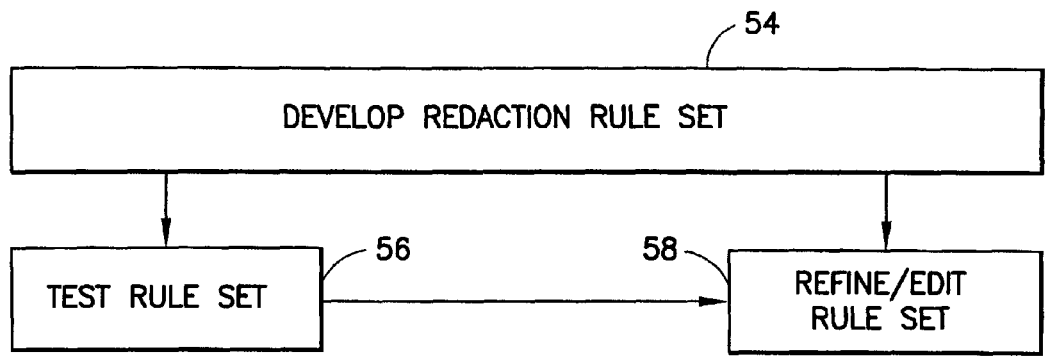
FIG. 12 is a flowchart depicting a method in accordance with one embodiment of the invention.

Referring also to FIG. 12, once a rule set is developed as indicated by block 54, the rule set is preferably tested as indicated by block 56. Testing can also be conducted periodically after the rule set is in place. As indicated by block 58, the rule set can preferably be refined and edited. For example, names of police officers can change because of the addition of new police officers. The rule set could be edited to include the names of new police officers. In addition, if testing finds an error or conflict causing an error, the rule set can preferably be refined. Rules could also be auto-generated based upon subsequent manual redactions by users. The rules set could be accumulating for redaction maintenance. There could be automatic use of common rules for multiple users or documents or other specifics.

Figure 13:
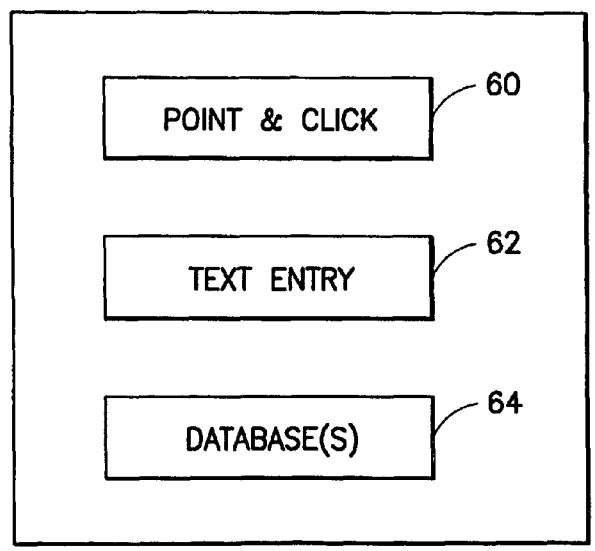
FIG. 13 depicts tools for use in entering rules into the rule set of one embodiment of the invention.

Referring now also to FIG. 13, identification of cells and text in a document for a rule set can comprise, for example, a point and click procedure with a mouse as indicated by block 60, a text or data entry by a keyboard as indicated by block 62, or import from another database as indicated by block 64. These are only some examples of how information can be input into a rule set. Any suitable alternative for data entry could be used including relationship correlation in text. For example:

If "X" before "Y", then redact "X" and "Y".

Figure 14:
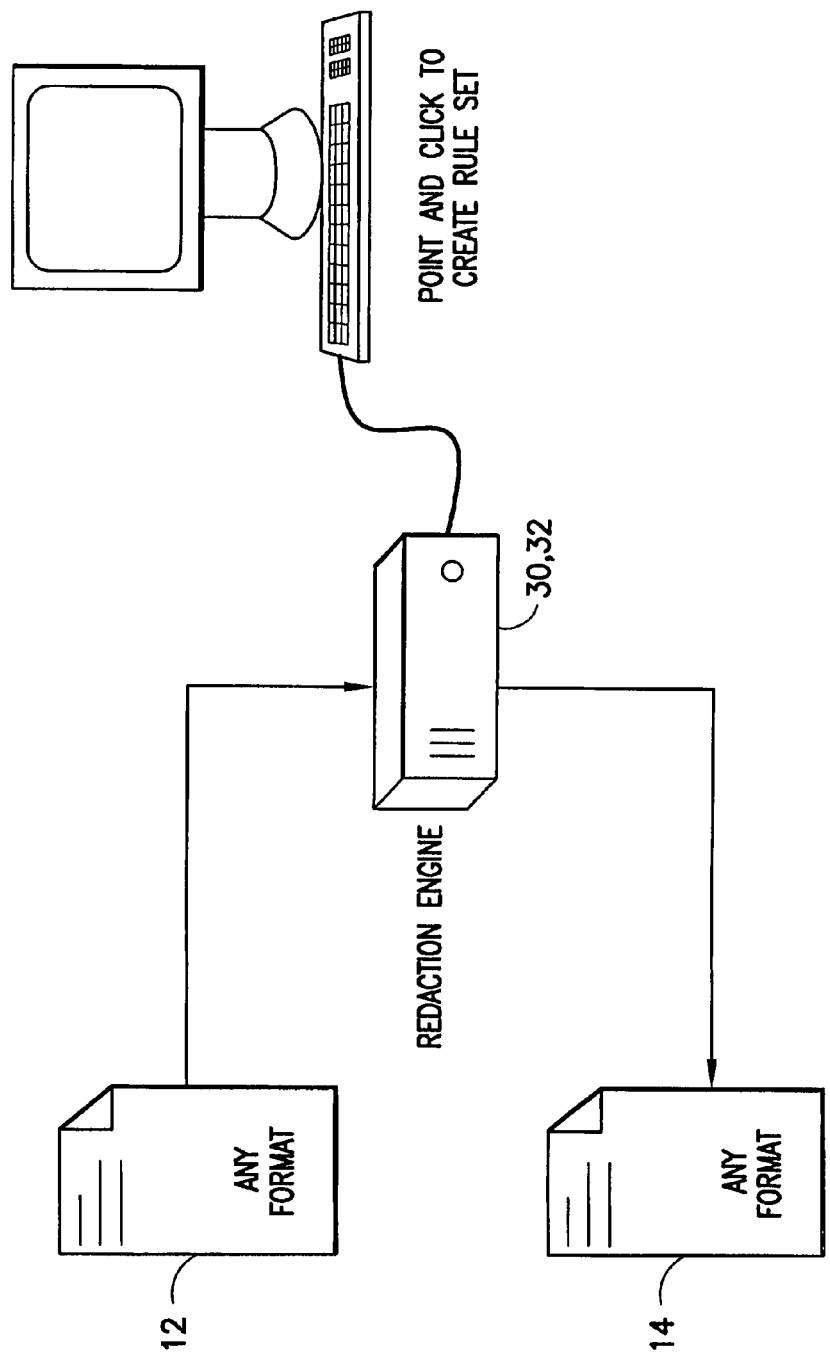
FIG. 14 depicts an aspect of one embodiment of the invention wherein one embodiment of the invention can operate on documents in any format.
Figure 15:
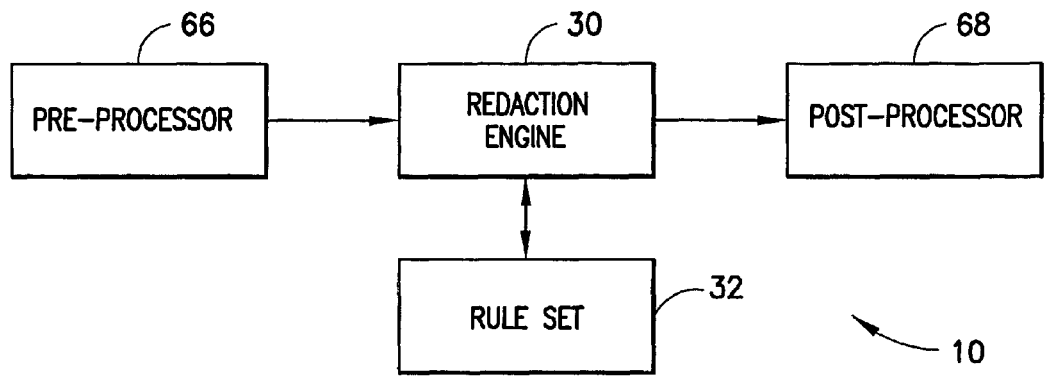
FIG. 15 is a block diagram of a system in accordance with one embodiment of the invention.
Figure 16:
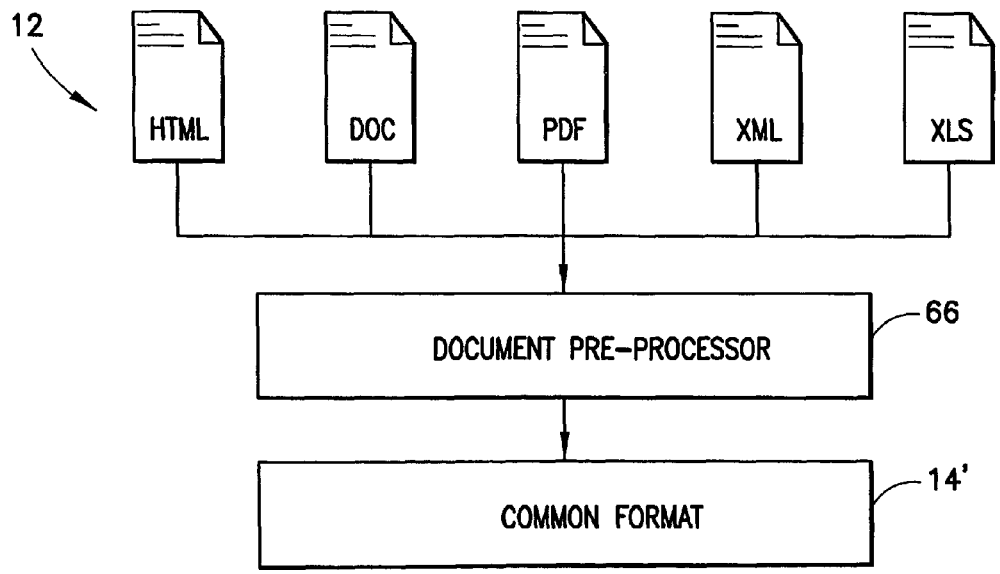
FIG. 16 is a block diagram depicting documents in several formats being input into a system operating in accordance with one embodiment of the invention for redaction purposes and being output in a common format.
Figure 17:
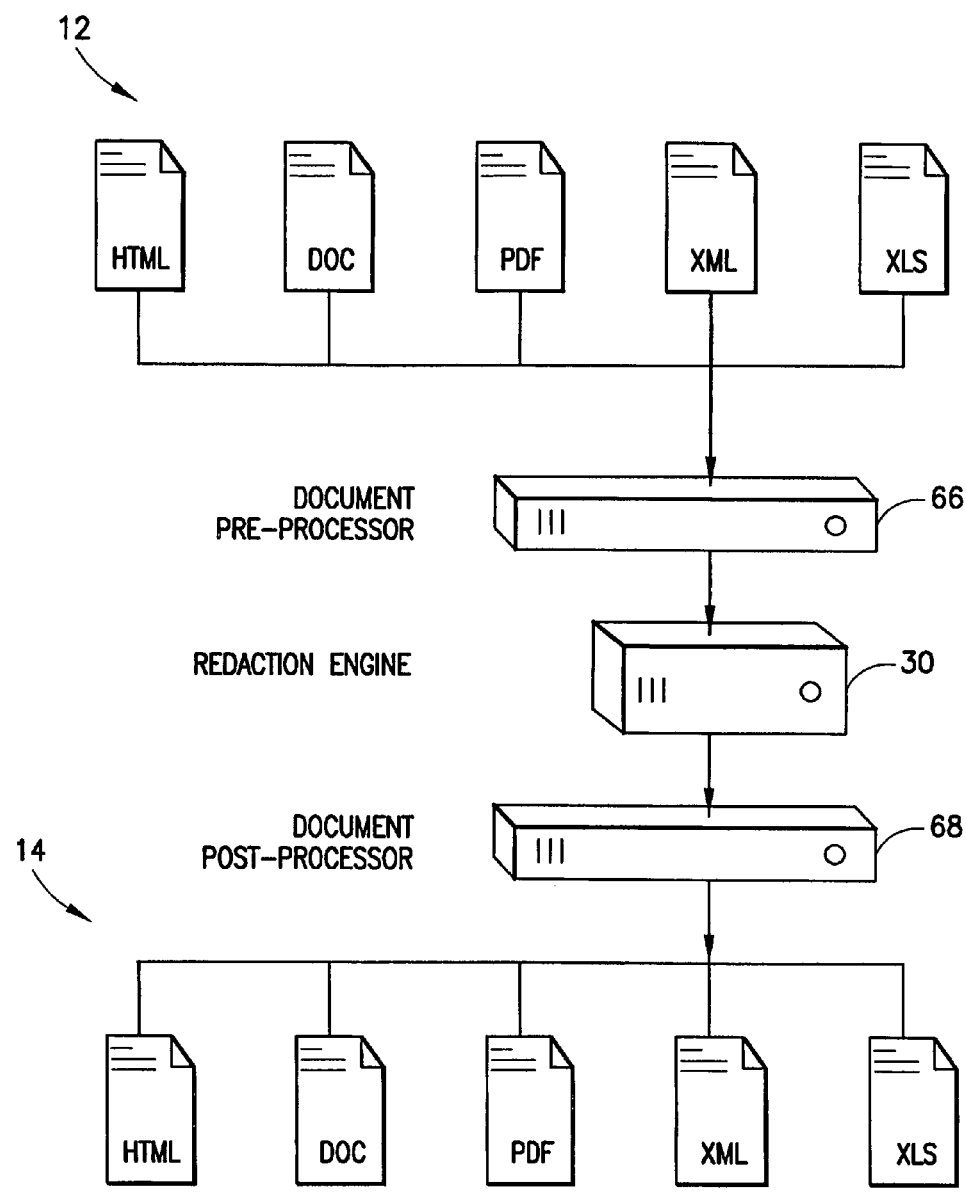
FIG. 17 is a block diagram depicting documents in several formats being input into a system operating in accordance with one embodiment of the invention for redaction purposes and being output in several formats.

Referring also to FIG. 14, in a preferred method the system is adapted to work with any suitable type of original document format and output any suitable type of modified document format. Referring also to FIGS. 15-17, the original document 12 could comprise any one of a plurality of different document formats. For example, the original document could comprise HTML, DOC, PDF, XML, or XLS format. The system could be adapted to work with any suitable format. Those formats mentioned above are merely examples. As illustrated in FIG. 15, the redaction system 10 can comprise a document pre-processor 66 and a document post-processor 68. As seen with reference to FIG. 16, the document pre-processor 66 is adapted to convert the format of the original document 12 to a common format 14' such as WEBRECORDER™ XML format or CELWARE XML format by CelCorp Inc. for example. This allows a document to be broken into regions to be identified with the redaction rule set. After the redaction engine, the document post-processor 68 can convert the modified document from its common format 14' to a target format 14, such as a HTML, DOC, PDF, XML, or XLS format for example.

Figure 18:
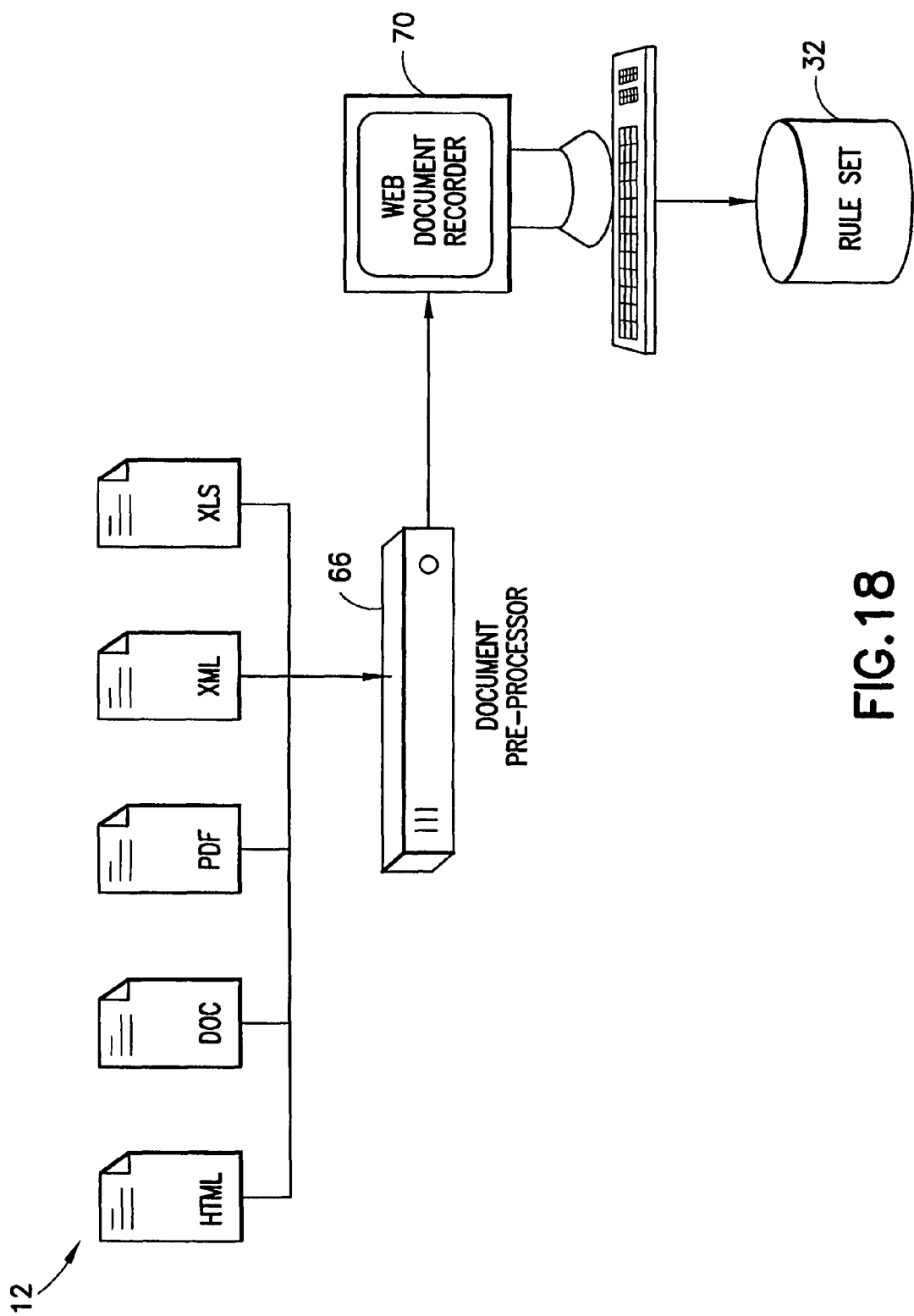
FIG. 18 is a block diagram of a system in accordance with one embodiment of the invention operating in a networked environment.

Referring also to FIG. 18, features of one embodiment of the invention could be used over the Internet or on a web site. A web document recorder 70 could be connected to as a server for a web site. The recorder 70 could form a link to the documents via the Internet, but with the redaction engine running in the recorder 70. The recorder 70 could apply the rule set 32 as needed when the documents are viewed on the web site supported by the web document recorder 70.

Figure 19:
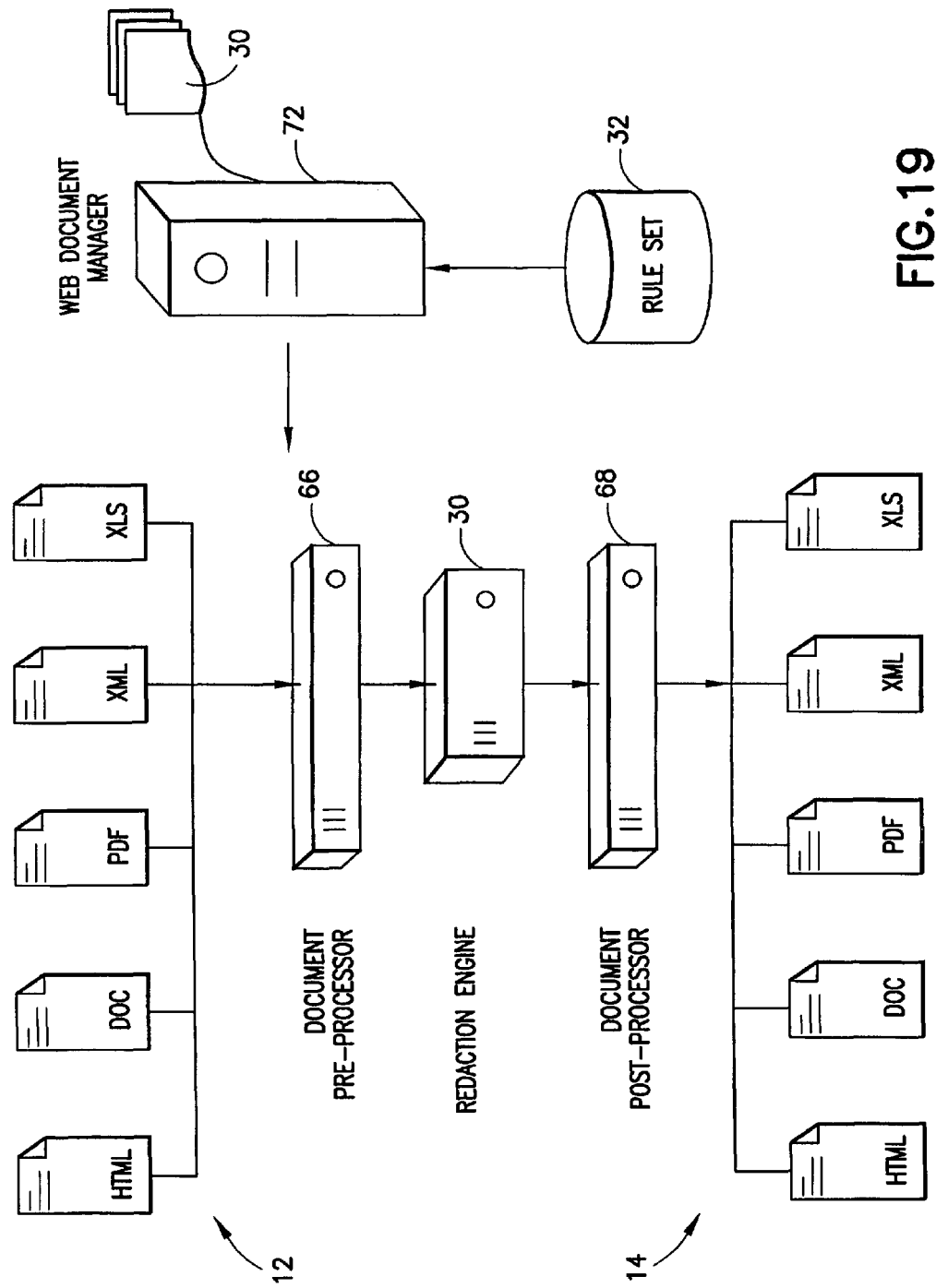
FIG. 19 is a block diagram of a system in accordance with another embodiment of one embodiment of the invention operating in a networked environment.

Referring also to FIG. 19, features of one embodiment of the invention could be used with a web document manager or server 72. The manager 72 could manage application of the rule set with the document pre-processor 66, redaction engine 30 and document post-processor 68. With this type of system the same rule set 32 could be used with multiple redaction engines.

Figure 20:
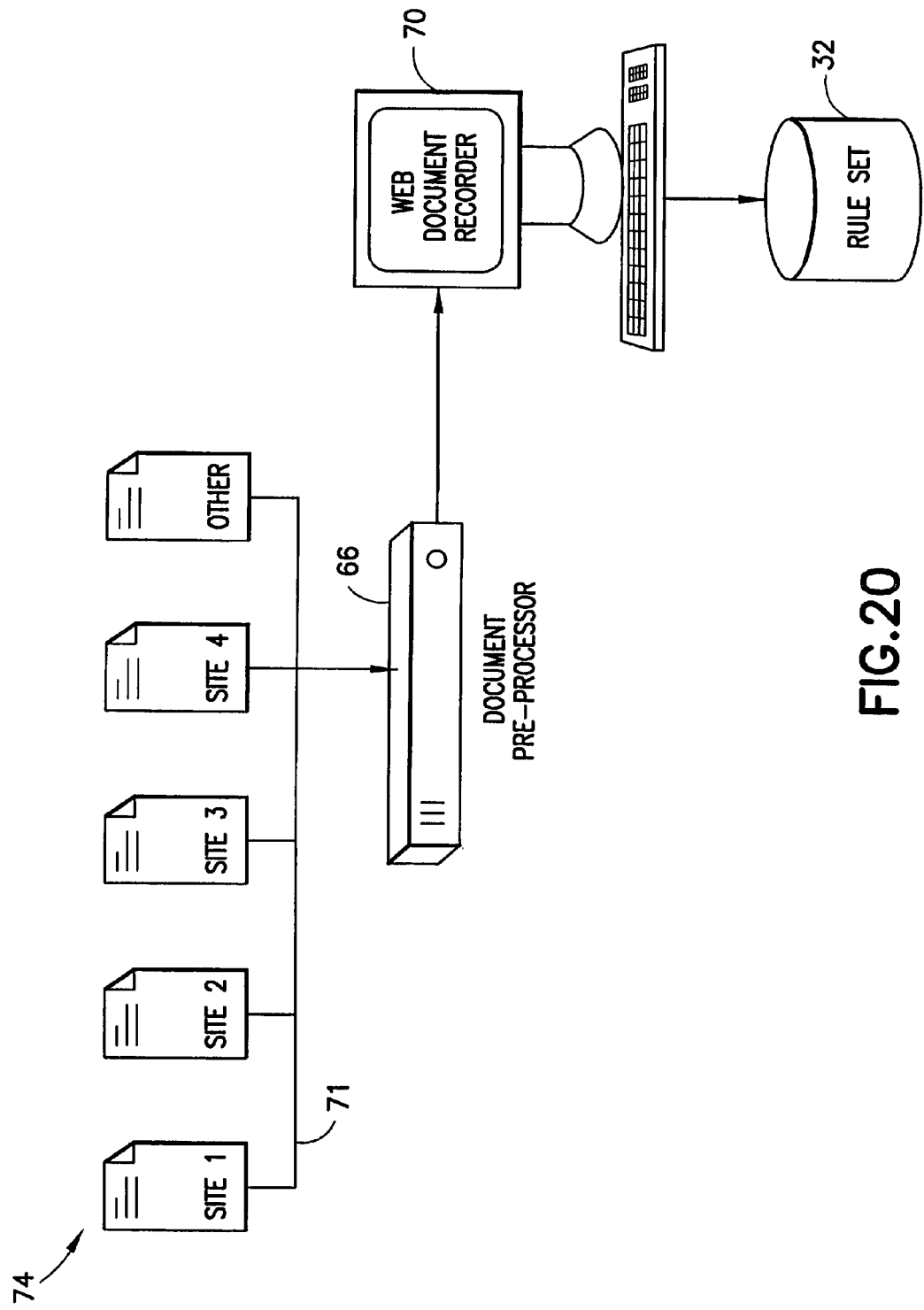
FIG. 20 is a block diagram depicting a system operating in accordance with one embodiment of the invention in which documents sourced from several sites over a network are input into a system for redaction purposes.

Referring also to FIG. 20, the system shown in FIG. 18 could be used in connecting documents from multiple sites 74 to the web document recorder 70 such as 71 symbolizing the Internet or a computer network.

Figure 21:
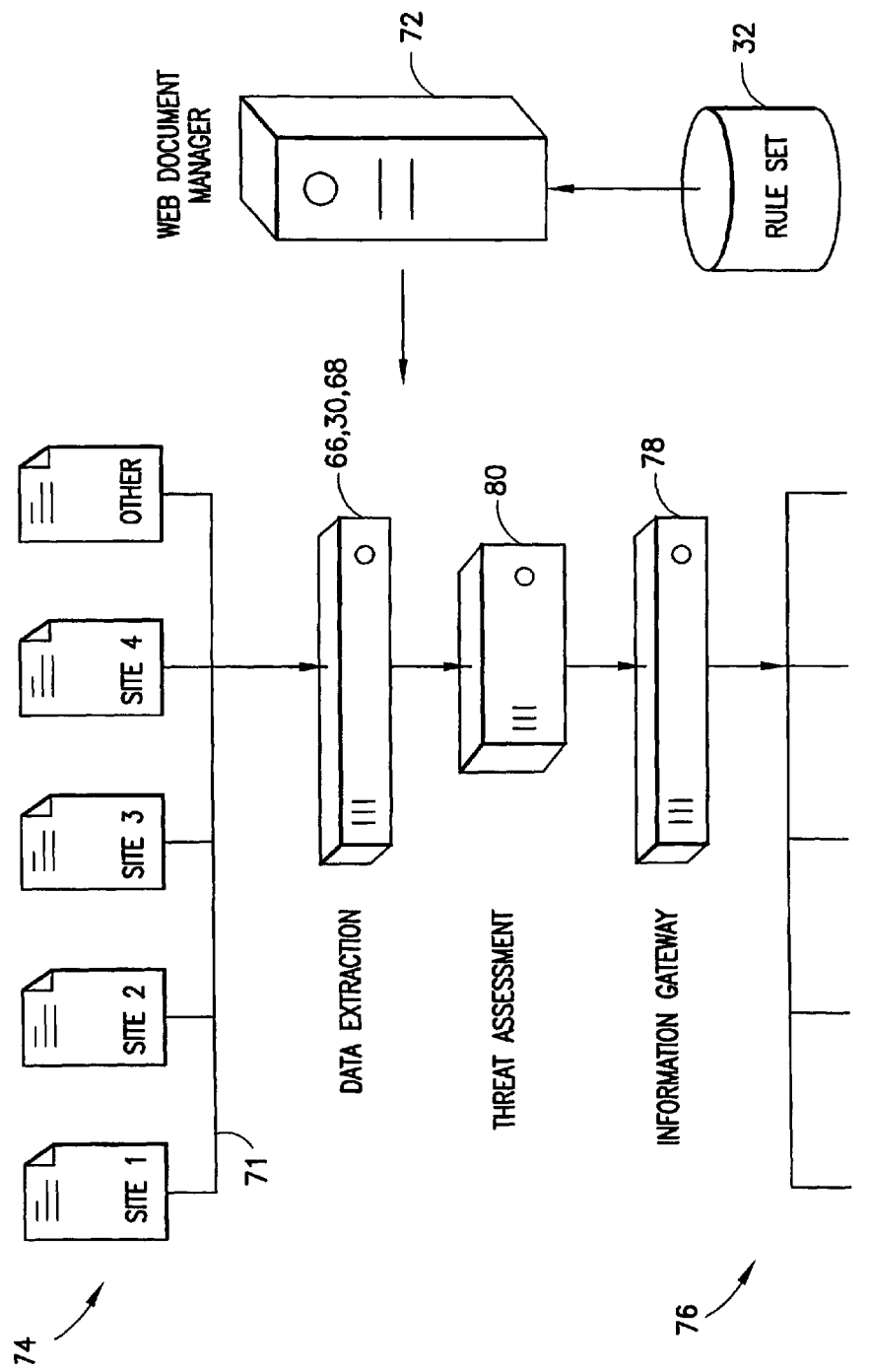
FIG. 21 is a block diagram depicting a system operating in accordance with one embodiment of the invention in which documents sourced from several sites over a network are input into a system for redaction purposes and then made available over a network following redaction.
Figure 22:
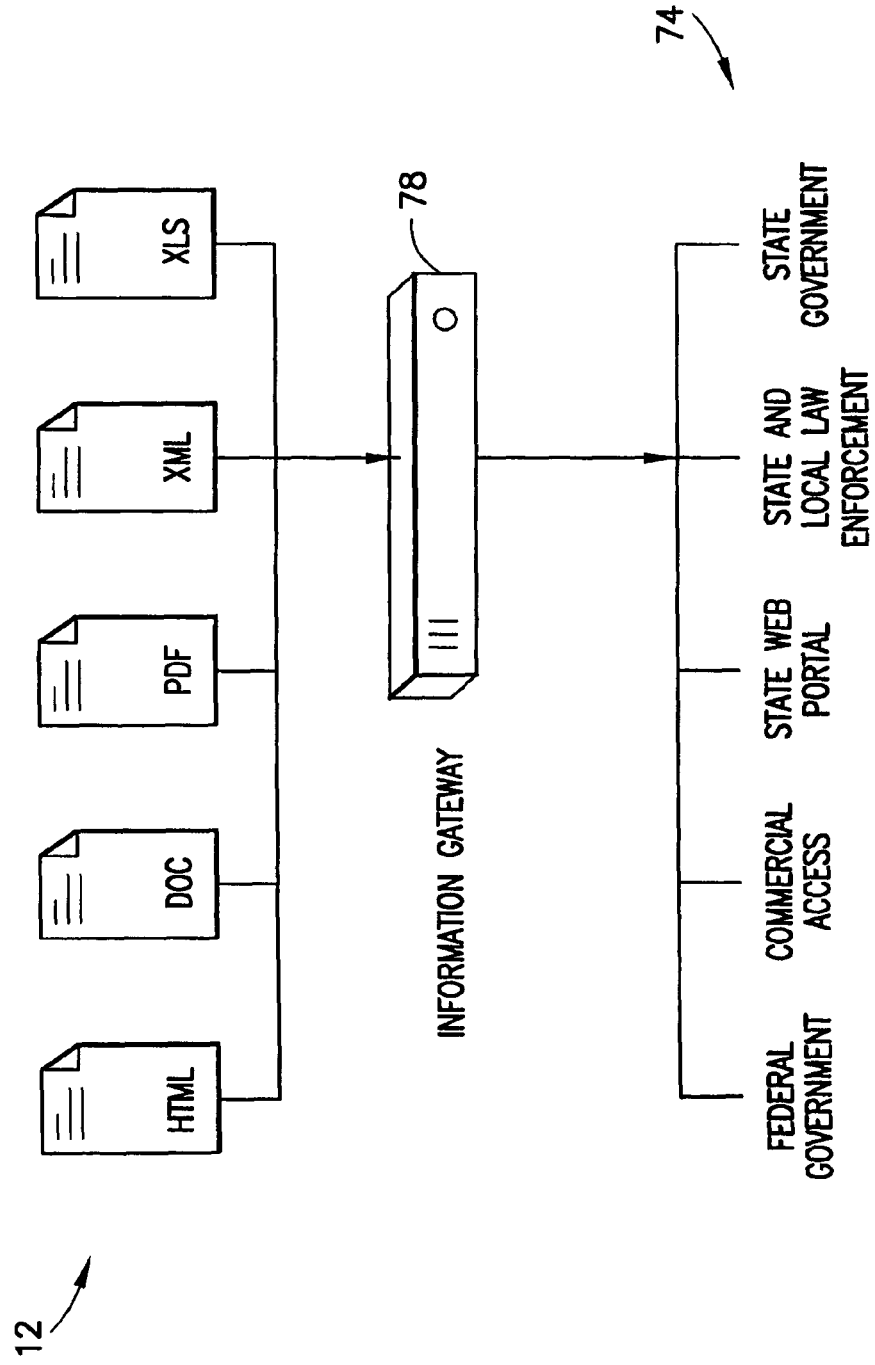
FIG. 22 is a block diagram depicting a system operating in accordance with one embodiment of the invention in which documents in several formats are made available over a network following redaction.

Referring also to FIG. 21, the system shown in FIG. 19 could be used in connecting documents from multiple sites 74 to multiple agencies 76 with the addition of an information gateway 78 and perhaps a threat assessment system 80. For example, the agencies could comprise the FBI, Police, Hospitals, 911 service, or other agency. The threat assessment system 80 could record web process, automate the web process, and correlate information across web sites and other information sources. Referring also to FIG. 22, the Gateway 78 can be adapted to sort and route information such that information is available to users on a predetermined basis, such as by document type or information in the cells of the documents for example.

With one embodiment of the invention, documents could be redacted in real time or, alternatively, the documents could be pre-redacted and stored for subsequent viewing. Alternatively, the system could be adapted to redact documents in real time, but once redacted store the redacted document for subsequent viewing without further automated redaction being needed for the same document. In other words, a library of redacted documents could be created over time. A batch of documents could also be redacted and stored if desired for an immediate library or database of redacted documents, thus allowing separation of the redacted document database from more secure original document databases.

The methods depicted and described herein can be tangibly embodied as a computer program in a computer-readable memory medium. Such computer-readable memory media comprise an aspect of one embodiment of the invention. Instructions of the computer program perform operations in accordance with the methods of one embodiment of the invention when executed by digital processing apparatus. Tangible computer-readable memory media included, but are not limited to, hard drives, CD- or DVD ROM, flash memory storage devices or RAM memory of a computer system.

With one embodiment of the invention, a system can be provided comprising a source of electronic documents to be redacted; a source of redaction rules; a redaction engine coupled to the source of electronic documents and the source of redaction rules, the redaction engine configured to redact the electronic documents in accordance with the redaction rules contained in the source of redaction rules, the redaction engine configured to perform operations, the operations comprising:
  accessing electronic documents to be redacted;
  accessing redaction rules from the source of redaction rules;
  redacting the electronic documents in accordance with the redaction rules, creating redactions in the electronic documents; and
  generating tangible versions of the electronic documents containing the redactions.

The source of electronic documents can comprise an electronic database. The source of electronic documents can comprise an electronic database accessible over a network. Generating a tangible version can comprise displaying redacted versions of the electronic documents on a display screen. Redacting the electronic documents in accordance with the redaction rules can comprise identifying the electronic documents by document type; selecting redaction rules to be applied to the electronic documents in dependence on the identified document type; and redacting the electronic documents in accordance with the selected redaction rules.

The electronic documents can comprise categories of information; where the redaction rules specify which categories of information are to be redacted; and where redacting the electronic documents in accordance with the redaction rules further comprises redacting information contained in the electronic documents corresponding to the categories of information specified in the redaction rules. The categories of information can comprise text information. The categories of information can comprise graphical information. The graphical information can comprise an organization logo. The categories of information can comprise visual information. The visual information can comprise photographic information. The electronic documents can comprise a plurality of document cells, where the selected redaction rules specify which document cells are to be redacted, and where redacting the electronic documents in accordance with the selected redaction rules further comprises redacting the document cells in the electronic documents specified in the selected redaction rules. The electronic documents can comprise categories of text, where the selected redaction rules specify which categories of text are to be redacted, and where redacting the electronic documents in accordance with the selected redaction rules further comprises redacting text in the electronic document corresponding to categories of text specified in the selected redaction rules. The electronic documents can contain identification codes identifying document type, and where identifying the document further comprises detecting the identification codes in the electronic documents to determine document type.

The identifying the electronic documents by document type can comprise receiving inputs identifying the electronic documents by document type. Identifying the electronic documents by document type can comprise using pattern recognition to identify the electronic documents by document type. Document redaction can be performed in real time. The electronic documents can be stored in unredacted form and wherein redacting the electronic documents in accordance with the redaction rules is performed in real time when a user not entitled to view in unredacted form an electronic document contained in the source of electronic documents accesses the electronic document. Redacting the electronic documents in accordance with the redaction rules can be performed prior to requests for electronic documents contained in the source of electronic documents, the operations further comprising: saving to memory redacted electronic documents.

The source of electronic documents can comprise a scanning system configured to convert hard copies of documents to electronic documents; and a database configured to store the electronic documents created by the conversion. Redactions can be reflected in the tangible version by redaction indicia, the redaction indicia identifying what categories of information have been redacted in the electronic documents. Redactions might not be identified by redaction indicia, the absence of redaction indicia masking what categories of information have been redacted in the electronic documents. The source of redaction rules can comprise a redaction rule entry system configured to receive redaction rules to be used when performing redaction operations. The redaction rule entry system can comprises a redaction rule editing system for editing pre-existing redaction rules comprising the source of redaction rules. The redaction rule entry system can be configured to receive commands associating redaction rules with specific electronic document types, wherein a particular redaction rule associated with a particular electronic document type is used when redacting electronic documents corresponding to the particular electronic document type.

The source of redaction rules can comprise rules specifying cells in electronic documents to be reproduced without redaction. The operations can comprise identifying cells in electronic documents corresponding to cells the redaction rules specify are to be reproduced without redaction; reproducing the identified cells without redaction. The operations can comprise detecting a conflict between at least one rule indicating a particular cell is to be redacted and at least one rule indicating the particular cell is to be reproduced without redaction; and resolving the conflict. The system can further comprise a manual redaction entry system configured to allow users to manually redact electronic documents; and where the source of redaction rules further comprises an automated system configured to monitor patterns of manual redactions entered by users and to generate redaction rules in dependence on the monitoring activity.

The source of redaction rules can comprise rules specifying categories of information to be reproduced without redaction. At least one of the categories of information can comprise text information. At least one of the categories of information can comprise graphical information. At least one of the categories of information can comprise visual information. The visual information further can comprise photographic images. The system is can be configured to redact electronic documents recorded in a plurality of different electronic formats.

The system can further comprise an electronic document pre-processor configured to identify which electronic format a particular electronic document is recorded in and to convert the particular electronic document to a common electronic format. Redacting the electronic documents in accordance with the redaction rules can comprise performing the redaction operations on the electronic documents when the electronic documents are in the common format. The electronic document pre-processor can be configured to impose a cell format on a particular electronic document in dependence on redaction rules contained in the source of redaction rules. Redacting the electronic documents in accordance with the redaction rules can comprise redacting cells generated in the particular electronic document by the imposition of a cell format. The system can further comprise an network gateway for disseminating redacted electronic documents to users.

A computer program product can be provided comprising a computer readable storage medium storing a computer program configured to perform redaction operations when executed by digital processing apparatus, the operations comprising:
  accessing an electronic document to be redacted;
  accessing at least one redaction rule to be applied to the electronic document;
  redacting the electronic document in accordance with the redaction rule; and
  storing the redacted electronic document in computer memory.

The computer program product operations can further comprise generating a tangible version of the redacted electronic document. The computer program product can generate a tangible version of the redacted electronic document and further comprises displaying the redacted electronic document on a display device. The computer program product can generating a tangible version of the redacted electronic document further comprising printing a hard copy of the redacted electronic document. The computer program product operations can further comprise: after accessing the electronic document to be redacted and prior to redacting the electronic document, converting the electronic document into a different electronic format, and wherein redacting the electronic document further comprises redacting the electronic document in the different electronic format. The computer program product operations can further comprise converting the redacted electronic document into a different electronic format.

With one embodiment of the invention a method can be provided comprising receiving redaction rules to be used in redacting electronic documents, where the redaction rules are specified in dependence on document type; storing the redaction rules to a computer memory, the computer memory comprising a source of redaction rules; accessing an electronic document to be redacted from a source of electronic documents; identifying the electronic document to be redacted by document type; accessing redaction rules from the source of redaction rules appropriate for use in redacting the type of document to which the electronic document corresponds; redacting the electronic document in accordance with the redaction rules specified for the document type to which the electronic document corresponds, creating redactions in the electronic document; and generating a tangible version of the electronic document containing the redactions.

One of the features of one embodiment of the invention is the ability to provide redaction other than at a redacted document viewer's location. For example, the actual redaction could occur at a location remote from the viewer's location and subsequently viewed by the viewer remote from the location where redaction actually occurred. This type of system and method can alleviate the need for the viewer to have the redaction software on his/her computer or computer network. For example, the viewer could use the Internet to access a remote computer which performed the redaction. As another example, the document could be sent by mail or courier to a remote location, such as in an electronic form, and sent to a viewer or otherwise made available in a redacted electronic form. Examples of this type of system and method are described with reference to FIG. 23.

Figure 23:
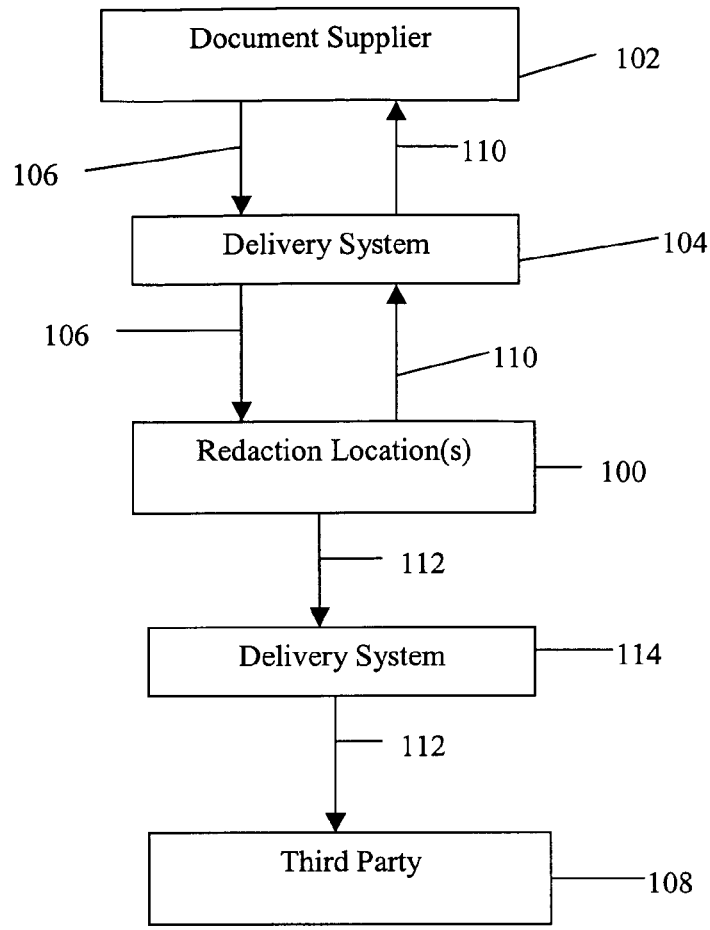
FIG. 23 is a block diagram illustrating one method and system of one embodiment of the invention.

As shown in FIG. 23, the system and method would comprise at least one remote redaction location. The remote redaction location(s) are preferably operated by a commercial service company which performs redaction services for its customers such as government departments or agencies for example. However, the service company could be partially or wholly owned by a government, such as a quasi-government agency for example. This is referred to hereinafter as merely a "redaction entity". The at least one remote redaction location could comprise a plurality of remote redaction locations, and perhaps even an additional local (non-remote) redaction capability. For a plurality of remote redaction locations, the remote redaction locations could be regional redaction company offices and perhaps different country redaction company offices.

The redaction location 100 comprises redaction software and equipment as described above to enable the redaction entity to produce redacted documents based upon un-redacted documents supplied to it. The redaction entity can then deliver the redacted documents. As shown in FIG. 23, a document supplier 102 supplies at least one document to the redaction entity at the redaction location 100 by a first delivery method 104 as indicated by arrows 106. The document supplier 102 could be a customer of the redaction entity or another party. The first delivery method 104 could comprise an electronic delivery method, such as via the Internet for example, or a non-electronic delivery method such as delivery of a paper document by post or by a courier for example. For an electronic delivery method, the original un-redacted document could be encrypted. The delivery could comprise a single document or a batch of multiple documents. The delivery could be regular, and/or sporadic such as when needed or requested by the customer for example, and/or based upon a real time (or substantially real time) interaction between a computer of the document supplier 102 and the computer at the redaction location 100. For example, a redacted document could be produced at almost the same time the un-redacted document is saved on the document supplier's computer, or perhaps at the end of the day or week. This can provide a virtual redaction service remote from the document supplier's location.

Once the redacted document(s) is/are created at the remote location 100, the redacted document(s) could be stored at the remote location 100 (or another storage location) and/or delivered to the document supplier 102 and/or a third party 108. The un-redacted document(s) delivered to the redaction entity could be stored at the remote location 100 (or another storage location) or deleted/destroyed or delivered to another location or entity.

If the redacted document is delivered to the document supplier it/they could be delivered as indicated by arrows 110 via the first delivery system 104 or perhaps a different delivery system. It should be noted that the un-redacted document(s) could be supplied by a first entity or person of the document supplier and the redacted document could be subsequently delivered to a second different entity or person of the document supplier. The delivery of the redacted document could merely comprise a person at a computer terminal at the document supplier using a viewer application to view the redacted document located on the computer at the remote location.

If the redacted document(s) is/are delivered to a person or entity 108 other than the document supplier 102, the redacted document(s) could be delivered as indicated by arrows 112 via a second delivery system 114. The second delivery system 114 could be the same as the first delivery system 104 or perhaps could be a different delivery system. In one type of embodiment, the delivery of the redacted document to the third party 108 could merely comprise a viewer application wherein a person at a computer terminal could view the redacted document located at the remote location.

As an example, the redaction entity could be a contractor hired by the Department of Defense for all Army JAG (Judge Advocate General) units. The redaction service center run by the redaction entity might be located in Washington D.C. However, all the various JAG units throughout the world could send un-redacted documents to the redaction service center, such as via secure telecommunications, and the remote service center could then send the redacted documents back to the requesting/supplying JAG unit. In this fashion, the rules used for redaction could be uniformly controlled at one location.

As another example, one embodiment of the invention could be used with the U.S. Department of Justice (DOJ). The redaction entity could be a contractor hired by the U.S. Department of Justice (DOJ). The redaction service center, run by the redaction entity, might be located in Washington D.C. However, all the various DOJ units throughout the United States of America could send un-redacted documents to the redaction service center (or regional centers), such as via secure telecommunications, and the remote service center could then send the redacted documents back to the requesting/supplying DOJ unit. In this fashion, the rules used for redaction could be uniformly controlled at one location.

Thus, one embodiment of the invention can be used to provide a remote (at least partially) redaction service; perhaps as a managed service center. Customers could purchase a subscription service such as at a periodic rate and/or perhaps at a per document or per word rate. This type of service can alleviate the need for the party desiring to have a document redacted from having to load and maintain the redaction software on his/her/its computer system.

In its simplest form, the service could be provided as an online Internet service. A document supplier 102 could upload an un-redacted document, using the Internet as the first delivery system 104, to the remote redaction location 100, such as with an SSL or PGP encryption of the un-redacted document. The document supplier could pay for the redaction service by credit card or deposit account or electronic funds transfer for example. The redaction entity would produce the redacted document and download it back to the document supplier 102 such as via the Internet for example. Thus, the redaction entity can operate an online redaction service for customers.

Figure 24:
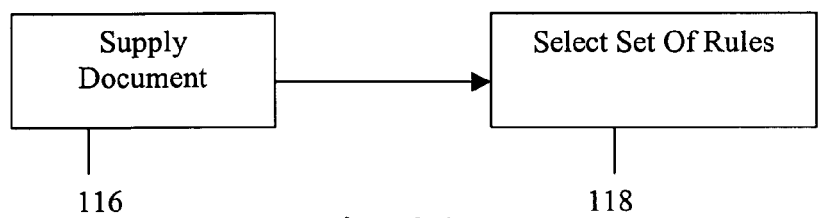
FIG. 24 is a block diagram illustrating one method and system of one embodiment of the invention.

As illustrated in FIG. 24, the redaction rules used by the redaction entity could be at least partially selected by the document supplier for a plurality of different sets of rules. The document supplier can supply the document(s) as indicated by block 116 and select a set of redaction rules as indicated by block 118. The selection could be as simple as "only names" or "names and dates" or "names and locations", or "Sensitive" versus "Top Secret" for example. Any suitable type of pre-determined rules sets could be provided for the user/supplier to select. Alternatively, the user/supplier may not be able to make a selection. As another alternative, the selection could be pre-determined based upon the department in a government agency or the type of document which redaction is being requested. For example, an employment application document or a document from a personal department might automatically have a first rules set versus a document from an intelligence department or an intelligence document which could automatically have a second rules set.

Figure 25:
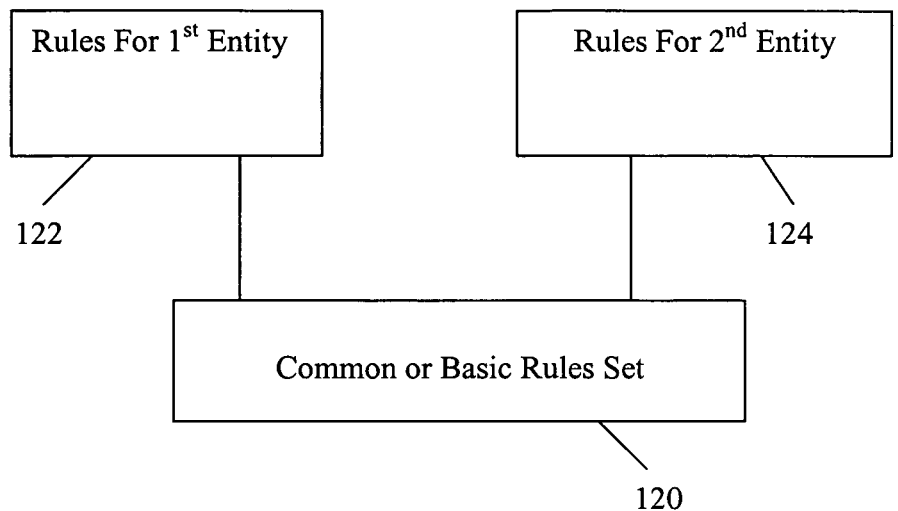
FIG. 25 is a block diagram illustrating one system and method of one embodiment of the invention.

The redaction entity could generate a comprehensive redaction set of rules based upon its interaction with totally separate customers who operate in similar fields. Referring to FIG. 25, for example, the redaction entity could generate a common or basic redaction set of rules 120 based upon requirements or rules of the New York City police department and the Boston police department as indicated by blocks 122 and 124. This could provide both customers (the New York City police department and the Boston police department) with a more desirable redaction, and perhaps uniform redaction procedures/rules less likely to be successfully challenged in a court of law. This could also be used by additional new customers, such as the Houston police department for example, as a basis for their use of the service; or at least a starting point for adapting the service to its use. Thus, the service can allow new users in similar fields to subscribe to the service without having to "reinvent the wheel" and start the rule set creation from scratch.

It is seen that the foregoing description has provided by way of exemplary and non-limiting examples a full and informative description of the best methods and apparatus presently contemplated by the inventors for performing document redaction. One skilled in the art will appreciate that the various embodiments described herein can be practiced individually; in combination with one or more embodiments described herein; or in combination with redaction systems differing from those described herein. Further, one skilled in the art will appreciate that the invention can be practiced by other than the described embodiments; that the described embodiments are presented for the purposes of illustration and not of limitation; and that the invention embraces all alternatives, modifications and variations that fall within the scope of the following claims.

What is claimed is:

1. A redaction system comprising:
   a system for receiving an electronic version of a first document;
   a system for generating an electronic version of a second document which is a redacted version of the first document, wherein the system for generating comprises a computer having a redaction engine coupled to a source of redaction rules, wherein the source of redaction rules comprises at least one rule for automatically excluding information in the first document from the second document; and
   a system for transmitting the second document from the redaction system.

2. A redaction system as in claim 1 further comprising a billing system for billing a customer for converting information from the first document into the second document.

3. A redaction system as in claim 1
   wherein the information, which the at least one rule excludes, comprises text information.

4. A redaction system as in claim 1
   wherein the information, which the at least one rule excludes, comprises information in a document cell.

5. A redaction system as in claim 1
   wherein the information, which the at least one rule excludes, comprises visual graphical information.

6. A redaction system as in claim 1 wherein the information, which the at least one rule excludes, comprises visual photographic information.

7. A redaction system as in claim 1 wherein the source of redaction rules comprise at least one rule for automatically including a second piece of information in the second document from the first document.

8. A redaction system as in claim 1 wherein the at least one rule is configured to exclude the information by replacing the information with a redaction marker.

9. A redaction system as in claim 1 wherein the at least one rule is configured to exclude the information by removing the information before creating the second document.

10. A computer program product comprising a computer readable storage medium storing a computer program configured to perform redaction operations when executed, the operations comprising:
receiving an electronic version of a first document;
generating an electronic version of a second document which is a redacted version of the first document, wherein generating comprises a computer having a redaction engine coupled to a source of redaction rules, wherein generating the second document comprises at least one rule of the source of redaction rules automatically excluding a first piece of information in the first document from being contained in the second document; and
transmitting the second document from the redaction system.

11. A computer program product as in claim 10 wherein the computer program product is further configured to at least partially determine an invoice amount to bill a customer for converting information from the first document into the second document.

12. A method comprising:
receiving an electronic version of a first document;
generating an electronic version of a second document which is a redacted version of the first document, wherein generating the second document comprises a computer having a redaction engine coupled to a source of redaction rules having at least one rule which automatically excludes a first piece of information in the first document from being contained in the second document; and
transmitting the second document to another party.

13. A method as in claim 12 further comprising billing a customer for converting information from the first document into the second document.

14. A method as in claim 12 wherein the first piece of information comprises text information which is replaced by a redaction marker in the second document.

15. A method as in claim 12 wherein the first piece of information comprises information in a document cell which is replaced by a redaction marker in the second document.

16. A method as in claim 12 wherein the first piece of information comprises visual graphical information which is excluded.

17. A method as in claim 12 wherein the first piece of information comprises visual photographic information which is excluded.

18. A method as in claim 12 wherein the source of redaction rules comprise at least one rule for automatically including information in the second document from the first document.

19. A method as in claim 12 wherein automatically excluding the first piece of information from being contained in the second document comprises replacing the first piece of information from the first document with a redaction indication in the second document.

20. A method as in claim 12 wherein automatically excluding the first piece of information from being contained in the second document comprises removing the first piece of information before creating the second document.

21. A redaction system comprising:
a system for receiving an electronic version of a first document;
a system for automatically generating an electronic version of a second document which is a redacted version of the first document when the first document is requested by a third party, wherein the system for generating comprises a computer having a redaction engine coupled to a source of redaction rules, wherein the source of redaction rules comprise at least one rule for automatically including a first piece of information in the first document in the second document, and wherein the system for generating the electronic version of the second document is configured to automatically expunge a second piece of information in the first document from being in the second document; and
a system for transmitting the second document from the redaction system to the third party.

22. A method comprising:
based upon a request for a first document, automatically generating an electronic version of a second document, where the second document is different from the first document and includes at least some information from the first document, where a processor connected to a memory having a source of rules automatically applies at least one of the rules to information from the first document to automatically generate the second document when the request for the first document is made; and
storing the second document or transmitting the second document.

23. An apparatus comprising:
a system for automatically generating an electronic version of a second document based upon a request for a first document, where the second document is different from the first document and includes at least some information from the first document, and where the system for automatically generating the electronic version of the second document comprises a processor connected to a memory having a source of rules; and
a system for storing the second document or transmitting the second document,
where the system for automatically generating the electronic version of the second document is configured to automatically apply at least one rule from the source of rules to information from the first document to automatically generate the second document when the request for the first document is made.

* * * * *